Patented Aug. 11, 1942

2,292,997

UNITED STATES PATENT OFFICE 2,292,997

CAPILLARY-ACTIVE SULPHONIC ACID IMIDES

Winfrid Hentrich, Rodleben, near Dessau-Rosslau, Anhalt, and Erik Schirm, Dessau, Anhalt, Germany, assignors, by mesne assignments, to "Unichem" Chemikalien Handels A.-G., Zurich, Switzerland, a corporation of Switzerland No Drawing. Application August 3, 1939, Serial No. 288,130. In Germany August 3, 1938

5 Claims. (Cl. 260—556)

This invention relates to capillary-active sulphonimides and more particularly to their preparation from sulphonic acid halogenides and sulphonic acid amides.

In accordance with prior knowledge, higher molecular carboxyl derivatives of aryl sulphonic acid amides have been suggested as washing agents. The alkali salts of these compounds, however, have only limited water solubility and are greatly inferior to the compounds of the present invention in their capillary properties.

It is an object of this invention to provide the soap, textile, fur, paper and like industries with capillary-active compounds which are readily convertible into water-soluble saponaceous salts.

In accordance with the present invention, commercially valuable capillary-active compounds of the general formula $R.SO_2N(Cat).SO_2.R'$ are obtained by condensing sulphonic acid halogenides of the general formula $R.SO_2Hal$ with suitable metal derivatives of sulphonic acid amides of the general formula $R'.SO_2NH_2$ and by converting the obtained condensation product with organic or inorganic bases into water-soluble salts. In the general formulae, R and R' are organic substituents, at least one of which contains at least one lipophile group while the other substituent contains desirable cyclic or acyclic hydrocarbons which may be substituted or interrupted by hetero-atom or hetero-atomic groups; Cat denotes any desirable cation which is capable of forming water-soluble salts; and Hal denotes a halogen atom.

The lipophile group appearing in at least one of the organic substitutents consists of a hydrocarbon group of the aliphatic, cycloaliphatic, aliphatic-cycloaliphatic or aliphatic-aromatic series having at least 6 carbon atoms. The organic substituent containing the lipophile group may also contain hetero-atoms such as, for instance, halogen, oxygen, sulphur, nitrogen and like atoms, or hetero-atomic groups such as, hydroxyl, ketone, ester, sulphonic, amino, acylamino, sulphimide, and like groups. Suitable lipophile groups are, for example, hexyl, octyl, dodecyl, oleyl, montanyl, or branched groups such as isohexyl, isododecyl, isooctadecyl groups, and the like. The cyclic lipophile groups are, for example, cyclohexyl and cyclohexyl groups substituted in the nucleus by desirable alkyl groups; naphthenyl, abietyl, benzyl and tetrahydromenaphthyl groups; phenyl or naphthyl groups substituted in the nucleus by desirable alkyl or cycloalkyl groups, and the like.

In one of the preferred embodiments of the invention the second organic substituent represented by the letter "R" is a lower molecular aliphatic hydrocarbon group. This second substituent may also contain hetero-atoms or hetero-atomic groups, or it may, if desired, contain known water-solubilizing groups, such as, organic or inorganic acid groups, polyhydroxyl and/or poly-ethereal groups and the like.

The reaction between the raw materials of the present invention may be carried out in accordance with known practice either directly or in the presence of inert diluents such as benzine, hydrocarbon chlorides, benzol and the like. In the preferred embodiment of the invention the alkali metal derivatives of the sulphonic acid amides are used as one of the raw materials but the sulphonic acid amides may be used per se if the reaction takes place in the presence of acid-binding agents.

It is customary to use the halogenides of sulphonic acid as the other reagent. It is also possible to use functional derivatives of the sulphonic acids, however, such as sulphonic acid anhydrides, in the reactive process instead of the sulphonic acid halogenides.

Suitable raw materials for the process of the present invention are the halogenides and/or amides of the following examples of sulphonic acids: octyl sulphonic acid, dodecyl sulphonic acid, cetyl sulphonic acid, octadecyl sulphonic acid, p-dodecyl amino-benzene sulphonic acid, p-octadecyl hydroxy-benzene sulphonic acid, alkylated naphthalene and tetrahydronaphthalene sulphonic acids, methyl sulphonic acid, n-butyl sulphonic acid, propane-1,3-disulphonic acid, cyclohexyl sulphonic acid, benzyl sulphonic acid, p-toluene sulphonic acid, benzene-1,3-disulphonic acid, naphthalene-1-monosulphonic acid, naphthalene-1,5-disulphonic acid, naphthalene-1,3,6-trisulphonic acid, dimethyl aniline-p-sulphonic acid, 2,5-dichloraniline-4-sulphonic acid, and the like.

Among the condensation products obtained in accordance with the process of the invention are, for instance methyl-n-dodecyl sulphimide, dioctyl-sulphimide, p-toluene-dodecyl sulphimide, m-carboxy-phenyl dodecyl sulphimide, hexadecyl benzyl sulphimide, octadecyl cyclohexyl sulphimide, p-dodecyl-amino-benzyl methyl sulphimide, bis-(n-octyl sulpho)-1,3-phenylene disulphon-diimide having the formula

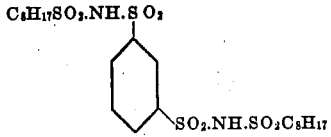

and the like.

The condensation products are converted into water-soluble salts in the usual manner with the aid of inorganic bases, such as, alkali metal, alkaline earth metal or ammonia bases; or with organic bases, such as primary, secondary or tertiary amines, hydroxy amines, quaternary ammonium compounds, such as triethyl ammonium hydroxide, and the like. The salts formed have typical capillary-active properties in an aqueous solution and are of a saponaceous character. They may, therefore, be used to excellent advantage in commercial enterprises and in industry as wetting, washing, cleaning, emulsifying and dispersing agents. For instance, they may be used in the cosmetic, soap, textile, leather, fur, and paper industries.

The following example, in which the parts appear as parts by weight, will serve to illustrate the inventive process but it is not to be considered as a limitation thereon.

*Example*

Ninety-six parts of the sodium salt of p-toluene sulphonamide and 170 parts of cetyl sulphochloride admixed with 500 parts of toluol are boiled for several hours under a reflux condenser. Upon elimination of the solvent, the condensation product is obtained in the form of a fatty to wax-like substance which is soluble in soda solution, forming a neutrally reacting sodium salt of the formula:

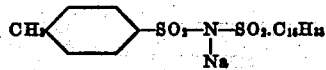

Aqueous solutions of the sodium salt, separated from the soda solution, foams and shows the characteristic properties of soap solutions.

The sodium salt of the octadecyl methyl sulphonimide having the formula:

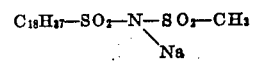

may be obtained in a like manner.

It should be understood that the present invention is not limited to the specific processes, compounds, and compositions herein disclosed but that it extends to all equivalents which one skilled in the art would consider within the scope of the appended claims.

I claim:

1. A capillary-active sulphonic acid imide, a water-soluble salt having the general formula $R.SO_2.N(Cat).SO_2.R'$, wherein one R is a lipophile hydrocarbon group containing at least 6 carbon atoms, and the other R is a lower molecular aliphatic hydrocarbon, and Cat is a cation salt-forming group.

2. A new capillary-active sulphonimide having the formula:

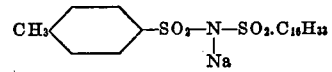

3. A new capillary-active sulphonimide having the formula:

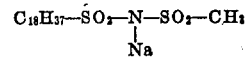

4. A capillary-active sulphonic acid imide, a water-soluble salt having the general formula $R.SO_2.N(Cat).SO_2.R'$, wherein R and R' are carbon chains, at least one of which is a lipophile group of at least 6 carbon atoms and Cat is a cation salt-forming group.

5. A capillary-active disulphonyl imide, a water-soluble salt having the general formula $R.SO_2.N(Cat).SO_2.R'$, wherein R and R' are hydrocarbon radicals, at least one of which is an aliphatic hydrocarbon radical of at least 6 carbon atoms, and Cat is a cation salt-forming group.

WINFRID HENTRICH.
ERIK SCHIRM.